US009973375B2

(12) United States Patent
Shatzkamer

(10) Patent No.: US 9,973,375 B2
(45) Date of Patent: May 15, 2018

(54) APP STORE PORTAL PROVIDING POINT-AND-CLICK DEPLOYMENT OF THIRD-PARTY VIRTUALIZED NETWORK FUNCTIONS

(71) Applicant: Cisco Technology, Inc., San Jose, CA (US)

(72) Inventor: Kevin Shatzkamer, Hingham, MA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 455 days.

(21) Appl. No.: 14/245,193

(22) Filed: Apr. 4, 2014

(65) Prior Publication Data
US 2014/0317293 A1 Oct. 23, 2014

Related U.S. Application Data

(60) Provisional application No. 61/814,685, filed on Apr. 22, 2013.

(51) Int. Cl.
G06F 15/16 (2006.01)
H04L 12/24 (2006.01)
G06F 9/455 (2018.01)

(52) U.S. Cl.
CPC ............ H04L 41/04 (2013.01); G06F 9/455 (2013.01); G06F 9/45558 (2013.01);
(Continued)

(58) Field of Classification Search
USPC ........................................ 709/212, 217, 219
See application file for complete search history.

(56) References Cited

U.S. PATENT DOCUMENTS 7,467,225 B2 * 12/2008 Anerousis ............... H04L 29/06 709/238
8,320,388 B2 * 11/2012 Louati ................. H04L 41/0806 370/254

(Continued)

FOREIGN PATENT DOCUMENTS

EP 2574005 A1 3/2013
WO 2011091056 A1 7/2011

OTHER PUBLICATIONS

"Tetrabyte Elastic Cache clusters on Cisco UCS and Amazon EC2", [online], Apr. 19, 2013, XP055127693, [retrieved on Jul. 9, 2014]. Retrieved from the Internet: <URL: http://web.archive.org/web/20130419235218/http://blog.gigaspaces.com/terabyte-elastic-cache-clusters-on-cisco-ucs-and-amazon-ec2>, 8 pages.

(Continued)

Primary Examiner — Joseph E Avellino
Assistant Examiner — Marshall McLeod
(74) Attorney, Agent, or Firm — Leon R. Turkevich

(57) ABSTRACT

In one embodiment, a method comprises receiving by an apparatus, via a wide area network, a request for deployment of a selected one of available virtualized network services advertised by the apparatus, the request identifying a host service provider to deploy the one virtualized network service; identifying, by the apparatus, virtualized network functions required by the host service provider for implementation of the one virtualized network service, each virtualized network function having a corresponding and distinct virtualized container specifying attributes for defining execution of the corresponding virtualized network function within one or more physical machines of the host service provider; and sending to the host service provider, by the apparatus, a service container specifying instructions for deploying the one virtualized network service, the service container including instructions for deploying the virtual- (Continued)

ized network functions as interdependent for implementation of the one virtualized network service by the host service provider.

20 Claims, 11 Drawing Sheets

(52) U.S. Cl.
CPC .......... *H04L 41/5054* (2013.01); *G06F 2009/45595* (2013.01); *H04L 41/5096* (2013.01)

(56) References Cited

U.S. PATENT DOCUMENTS

| | | | |
|---|---|---|---|
| 8,589,557 B1* | 11/2013 | Labat | G06F 9/5061 709/226 |
| 2011/0231899 A1* | 9/2011 | Pulier | G06F 9/45558 726/1 |
| 2012/0147894 A1* | 6/2012 | Mulligan | G06F 9/45533 370/395.53 |
| 2013/0212285 A1* | 8/2013 | Hoffmann | H04L 12/4641 709/226 |
| 2014/0059178 A1 | 2/2014 | Dutta et al. | |
| 2014/0074539 A1 | 3/2014 | Doering et al. | |

OTHER PUBLICATIONS

CISCO White Paper, "Cisco Cloud Computing—Data Center Strategy, Architecture, and Solutions", [online]. 2009. [retrieved on Feb. 16, 2012]. Retrieved from the Internet: <URL: http://www.cisco.com/web/strategy/docs/gov/CiscoCloudComputing_WP.pdf>, pp. 1-16.

Wikipedia, "Cloud computing", [online]. Dec. 4, 2013. [retrieved on Dec. 4, 2013]. Retrieved from the Internet: <URL: http://en.wikipedia.org/wiki/Cloud_computing>, pp. 1-64.

LTE Acronyms—lteencyclopedia, "LTE Acronyms", [online]. [retrieved on Jan. 18, 2014]. Retrieved from the Internet: <URL: https://sites.google.com/site/lteencyclopedia/lte-acronyms>, pp. 1-43.

Wikipedia, "Network Functions Virtualization", [online]. Dec. 2, 2013. [retrieved on Dec. 4, 2013]. Retrieved from the Internet: <URL: http://en.wikipedia.org/wiki/Network_Functions_Virtualization>, pp. 1-6.

Network Functions Virtualisation—Introductory White Paper, "Network Functions Virtualisation, An Introduction, Benefits, Enablers, Challenges & Call for Action", [online]. Oct. 22-24, 2012. [retrieved on Dec. 4, 2013]. Retrieved from the Internet: <URL: http://portal.etsi.org/NFV/NFV_White Paper.pdf>, pp. 1-16.

Betts et al., "Interactive Visual Orchestration with Curvature and Donabe", Open Stack Summit, Portland, Oregon, Apr. 18, 2013 [online]. Apr. 2013. [retrieved on Apr. 4, 2014]. Retrieved from the Internet: <URL: http://openstacksummitapril2013.sched.org/event/34aad71296676e18af9111d12dba70b4>, pp. 1-5.

Wikipedia, "Platform as a service", [online]. Nov. 13, 2013. [retrieved on Dec. 4, 2013]. Retrieved from the Internet: <URL: http://en.wikipedia.org/wiki/Platform_as_a_Service>, pp. 1-4.

* cited by examiner

APP STORE PORTAL PROVIDING POINT-AND-CLICK DEPLOYMENT OF THIRD-PARTY VIRTUALIZED NETWORK FUNCTIONS

This application claims priority to Provisional Application No. 61/814,685, filed Apr. 22, 2013.

TECHNICAL FIELD

The present disclosure generally relates to physical machine-based systems providing a web-based portal for purchase and point-and-click deployment of third-party virtualized network functions.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Virtualization has extended from a single application service (e.g., a virtualized operating system) to virtualization of network functions. As more network functions are virtualized and support elastic scale, the ability to perform commissioning, capacity planning, and management of devices grows increasingly complex. When a network operator dimensions infrastructure, the manual process includes the understanding of interdependency between multiple software elements.

Network Function Virtualization (NFV) is now an Industry Standards Group (ISG) within the European Telecommunications Standards Institute (ETSI). Virtualization of network functions aims to define an architectural standard for replacing hardware appliances with virtual appliance by evolving standard IT virtualization technology, to enable consolidation of many network equipment types onto industry standard high volume servers, switches and storage. It involves implementing network functions in software that can run on a range of industry standard server hardware, and that can be moved to, or instantiated in, various locations in the network as required, without the need to install new equipment. This technology could provide significant benefits for network operators and their customers: reduced operator capital expenditures and operating expenditures through reduced equipment costs and reduced power consumption; reduced time-to-market to deploy new network services; improved return on investment from new services; greater flexibility to scale up, scale down or evolve services; openness to the virtual appliance market and pure software entrants; and opportunities to trial and deploy new innovative services at lower risk. As more vendors develop virtualized network functions (VNFs), significant modifications in how network operators provision the virtual environment and install new VNFs will take form. Network operators currently tend to manually create new services by manually identifying the VNFs to be deployed for a new service, and manually deploying the identified VNFs using an Operational Support System (OSS).

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
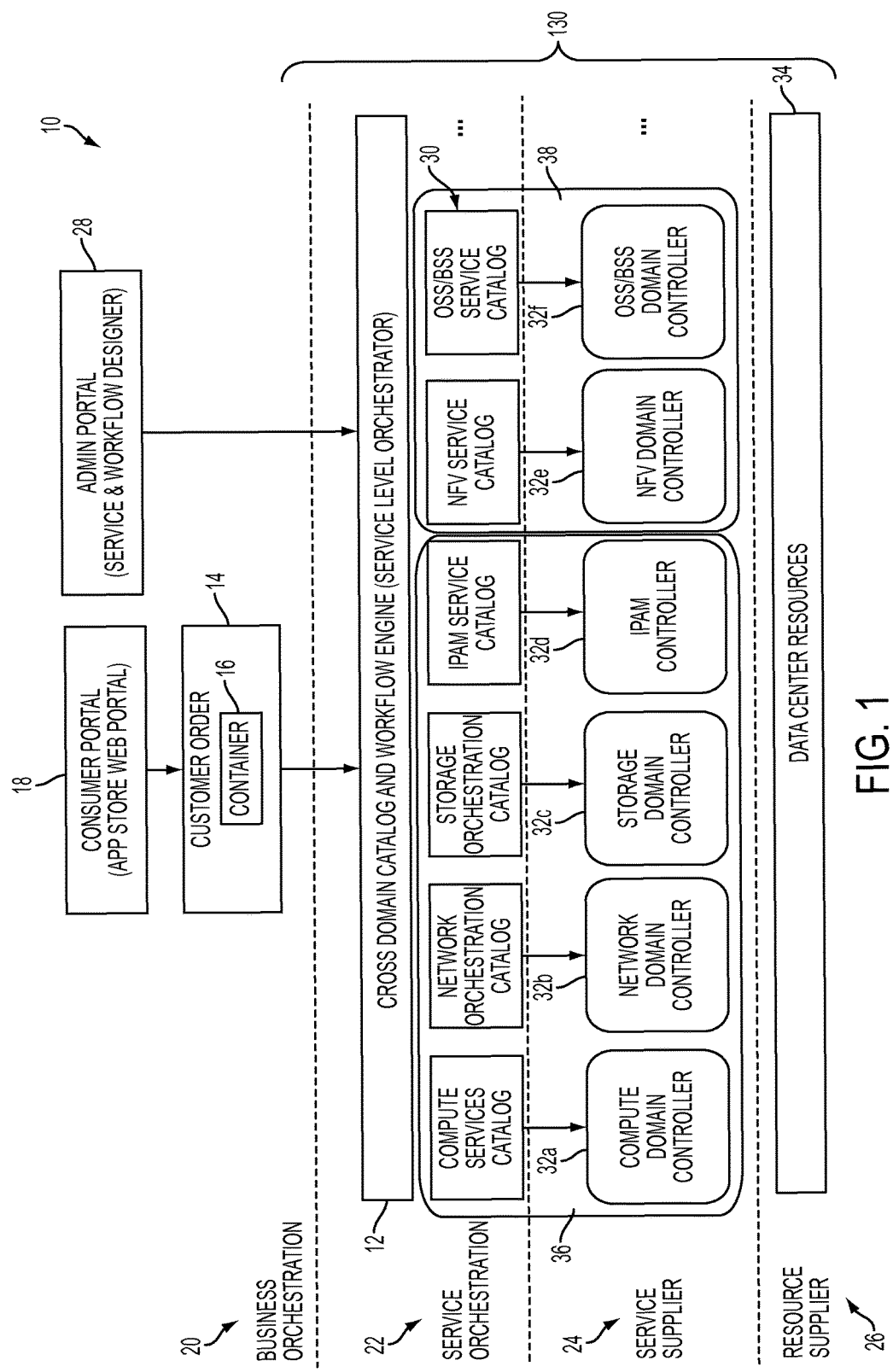
FIG. 1 illustrates an example architecture for point-and-click deployment of virtualized network services in a host service provider, based on sending a container specifying instructions to an orchestrator providing service level orchestration in the host service provider, according to an example embodiment.

In one embodiment, a method comprises receiving by an apparatus, via a wide area network, a request for deployment of a selected one of available virtualized network services advertised by the apparatus, the request identifying a host service provider to deploy the one virtualized network service; identifying, by the apparatus, virtualized network functions required by the host service provider for implementation of the one virtualized network service, each virtualized network function having a corresponding and distinct virtualized container specifying attributes for defining execution of the corresponding virtualized network function within one or more physical machines of the host service provider; and sending to the host service provider, by the apparatus, a service container specifying instructions for deploying the one virtualized network service, the service container including instructions for deploying the virtualized network functions as interdependent for implementation of the one virtualized network service by the host service provider.

In another embodiment, an apparatus is implemented as a physical machine and comprises non-transitory machine readable media, a device interface circuit, and a processor circuit. The non-transitory machine readable media is configured for storing executable machine readable code. The device interface circuit is configured for receiving a request via a wide area network. The processor circuit is configured for executing the machine readable code, and when executing the machine readable code operable for: determining the request is for deployment of a selected one of available virtualized network services advertised by the apparatus, the request identifying a host service provider to deploy the one virtualized network service; identifying virtualized network functions required by the host service provider for implementation of the one virtualized network service, each virtualized network function having a corresponding and distinct virtualized container specifying attributes for defining execution of the corresponding virtualized network function within one or more physical machines of the host service provider; and sending to the host service provider, via the device interface circuit, a service container specifying instructions for deploying the one virtualized network service, the service container including instructions for deploying the virtualized network functions as interdependent for implementation of the one virtualized network service by the host service provider.

In another embodiment, logic is encoded in one or more non-transitory tangible media for execution by a physical machine and when executed by the physical machine operable for: receiving, via a wide area network, a request for deployment of a selected one of available virtualized network services advertised by the apparatus, the request identifying a host service provider to deploy the one virtualized network service; identifying virtualized network functions required by the host service provider for implementation of the one virtualized network service, each virtualized network function having a corresponding and distinct virtualized container specifying attributes for defining execution of the corresponding virtualized network function within one or more physical machines of the host service provider; and sending to the host service provider a service container specifying instructions for deploying the one virtualized network service, the service container including instructions for deploying the virtualized network functions as interdependent for implementation of the one virtualized network service by the host service provider.

DETAILED DESCRIPTION

Particular embodiments can provide a digital distribution platform, or an "app store" for deployment of virtual network functions (VNFs) and/or virtualized network services (VNSs) in a host service provider such as a telecommunications service provider offering telecommunications services using a virtualized network infrastructure. The deployment in a host service provider (SP) of VNFs and/or VNSs requested based on a user accessing the VNS/VNF app store can be based on establishing standardized interfaces between the app store and different entities that communicate with the app store: example user entities that can communicate with the app store can include vendors, consumers, and web-based application programming interfaces (APIs) of the host service provider.

In one embodiment, a vendor (e.g., third party software developer, third party service vendor, service provider offering its own VNFs and/or VNSs, etc.), can communicate with the app store to submit its VNFs/VNSs according to prescribed certification requirements, for sale and distribution worldwide (e.g., via a wide area network). Consumers (e.g., service provider administrators, end customers subscribing to a host service provider, etc.) can communicate with the app store to request deployment of a selected VNF/VNS in a host service provider (from among multiple available service providers). The app store can communicate with web-based application programming interfaces of a host service provider, for example an app store query for details regarding VNFs, policies, available deployment locations, etc., for deployment of a virtualized network service according to generic requirements for the virtualized network service.

Hence, the example embodiments can provide a standardized web based application store portal that can provide a "point-and-click" deployment of third party virtualized network services (and/or virtualized network functions) in a host service provider.

A description will first be provided (with reference to FIGS. 1-7) of a host service provider that can deploy virtualized network services overlying a network infrastructure, followed by a description (with reference to FIGS. 8, 9A and 9B) of the "app store" that can provide "point-and-click" deployment of third party virtualized network services (and/or virtualized network functions) the host service provider.

Deployment of Virtualized Network Services in a Host Service Provider

The example embodiments enable an orchestrator (12 of FIG. 1) of a host service provider (130 of FIGS. 1 and 8) to identify within a virtual container the interdependence of specific software elements. In the example of Network Function Virtualization, being defined by the European Telecommunications Standards Institute (ETSI), the example embodiments can define interdependent Virtualized Network Functions and allow the management system to determine the appropriate interdependent scaling attributes between these virtualized network functions.

FIG. 1 illustrates an example architecture 10 of a host service provider 130 for coordinated execution of virtualized network services by an orchestrator 12 executed by a physical machine (e.g., 12 FIG. 5) and providing service level orchestration, according to an example embodiment. The architecture 10 illustrates a service level orchestrator 12 providing a virtualized network service and including a business level orchestration layer 20, a service orchestration layer 22, a service supplier layer 24, and a resource supplier layer 26. As described in further detail below, the orchestrator 12 can identify virtualized network functions required for implementation of a virtualized network service requested by a customer (e.g., a customer request 14 in the form of a container 16) for example via a web-based consumer portal 18. The orchestrator 12 also can receive administrative and provisioning requests (e.g., adding physical resources 26 to inventory for allocating capacity, described below) from an administrative portal 28.

The service orchestration layer 22 can include the service level orchestrator 12 and catalogs 30 that track allocated capacity and available capacity for various virtualized services 32. Example virtualized services 32 can include a compute domain controller 32a for virtualized compute services, a network domain controller 32b for virtualized network services, a storage domain controller 32c for virtualized storage services, and IP address management (IPAM) 32d for virtualized IP address management services, for example personalized dynamic host configuration protocol (DHCP) services, a service gateway application domain controller 32*e* for virtualized Internet Protocol (IP) services (described in further detail below with respect to FIG. 7), a Operation Support System (OSS)/Business Support System (BSS) domain controller 32*f* for virtualized OSS/BSS services, etc. Execution of the virtualized services can be implemented by a resource supplier layer 26 providing physical resources 34, for example in a data center at a single location or distributed among different geographic locations and interconnected via a public or private local and/or wide area data network (e.g., the Internet).

The orchestrator 12 can create, for each catalog 30 and associated controller 32, a corresponding container that defines the associated operations to be performed, described below. The orchestrator 12 can set interdependency indicators within each of the containers, enabling for coordinated monitoring and management of each of the virtualized functions provided by the various controllers 32. In particular, controllers 32*a*, 32*b*, 32*c*, and 32*d* can be part of a virtualized Infrastructure as a Service (IaaS) 36, and the controllers 32*e* and 32*f* can be part of a virtualized Platform as a Service (PaaS) 38. As described in further detail below, the interdependency indicators enable virtualized network function to operate as a "stateful" entity that enables coordinated execution, monitoring, and scalability management among the virtualized containers associated with a network service.

Figure 2:
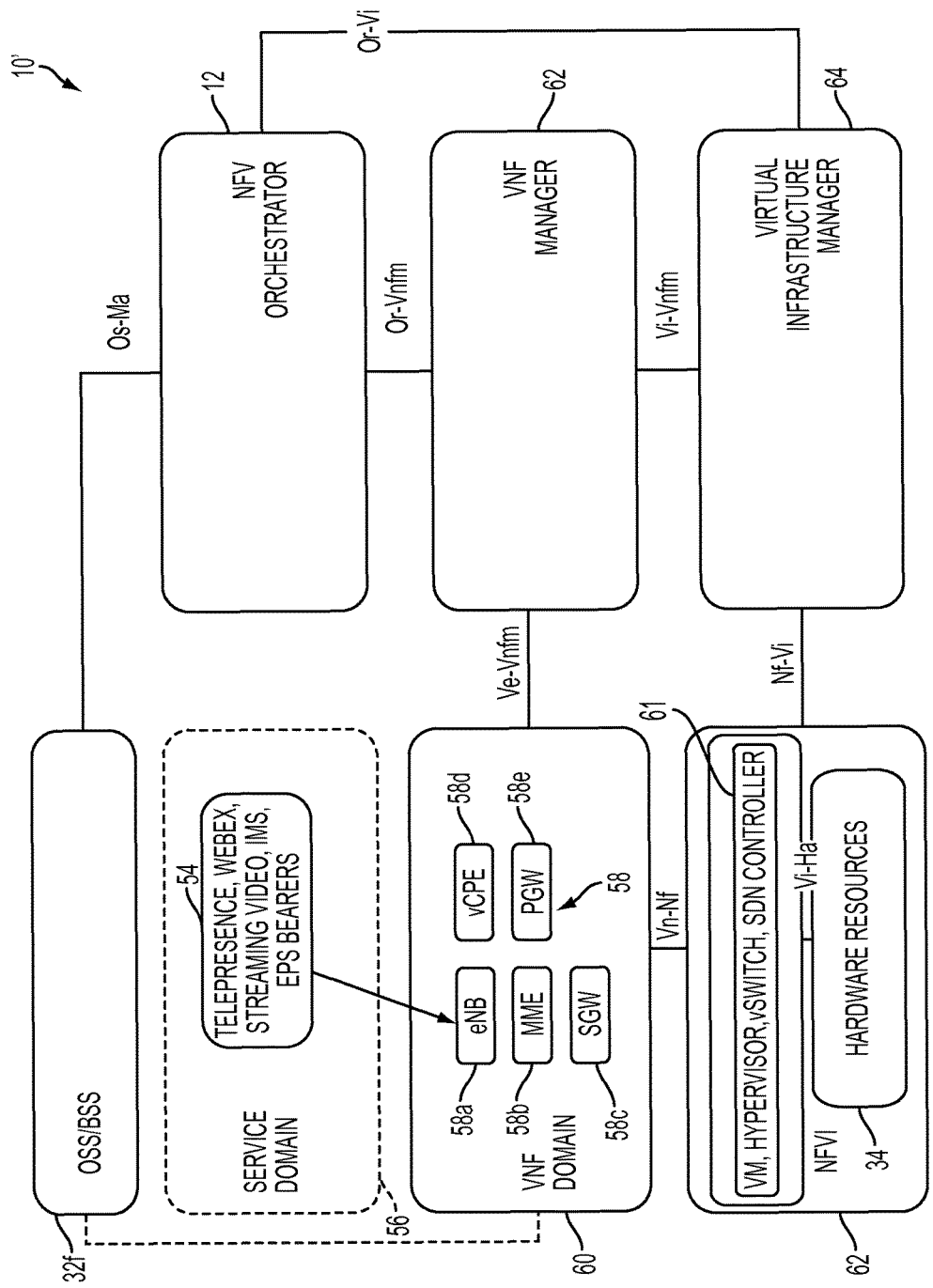
FIG. 2 illustrates another example architecture of the orchestrator of FIG. 1 providing coordinated execution of the virtualized network services based on execution of interdependent virtualized network functions according to an example embodiment.

FIG. 2 illustrates another example architecture 10' of the orchestrator 12 of FIG. 1 in a host service provider 130 providing coordinated execution of the virtualized network services based on execution of interdependent virtualized network functions according to an example embodiment. FIG. 2 illustrates a virtualized OSS/BSS domain controller 32*f* in communication with a service level orchestrator 12 for provisioning of virtualized network services 54 from within a service domain 56, also referred to as a service level container.

Figure 3:
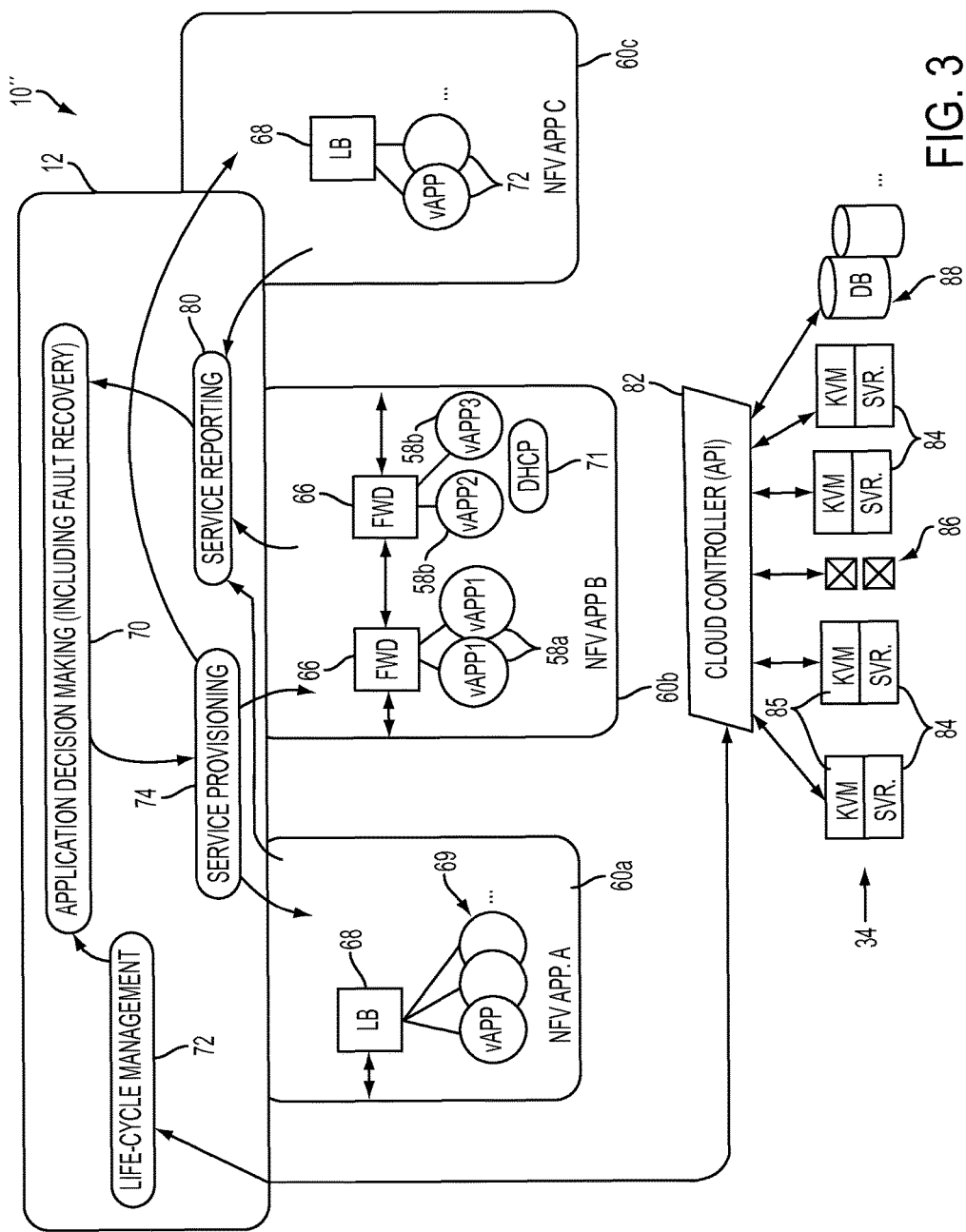
FIG. 3 illustrates another example architecture of the orchestrator of FIG. 1 providing coordinated execution of virtualized network functions across respective network function virtualization domains.

FIG. 3 illustrates a virtualized orchestrator 12 containing application decision-making logic (including fault recovery) 70, a life-cycle management controller 72, a service provisioning module 74, and a service reporting module 80 in another example architecture 10" of the host service provider 130. The life cycle management module 72 can communicate with a cloud controller API 82 controlling virtualized infrastructure services 62 provided by hardware resources 34, e.g., a physical server machine 84 hosting a kernel-based virtual machine (KVM) 85, network switching devices 86, database storage devices 88, etc. Example operations by the life-cycle management module 72 can include starting virtual machines with image/boot parameters, suspend or kill virtual machines, detect hardware-based heartbeats, receiving hardware load parameters (e.g., CPU utilization, memory utilization, network link utilization, etc.).

The service reporting module 80 of FIG. 3 can receive context-based alerts or load parameters from the virtualized network functions 60*a*, 60*b*, and/or 60*c*. For example, the network function virtualization (NFV) 60*a* can provide classifier operations for a virtualized IP services using a virtualized load balancer 68 and virtualized classifier applications 69; the NFV 60*b* can provide software defined networking (SDN) service chains for the virtualized IP services, for example using virtualized forwarding switches 66, virtualized service applications (e.g., eNodeB) 58*a* and mobility management entity (MME) 58*b*, etc., and a virtualized dynamic host configuration protocol (DHCP) module 71; and the NFV 60*c* can provide application analytics for the virtualized IP services using a virtualized load balancer 68 and virtualized analytics applications 72. As described below, the service reporting module can receive updates from any one of the virtualized elements of the NFV applications 60 based on an interdependency indicator set in the corresponding container for the virtualized element.

The application decision making (and fault recovery) module 70 can provide overall provisioning requests to the service provisioning module 74 based on the information from the life cycle management module 72 regarding the virtualized hardware and/or hardware state as reported by the cloud controller API 72, new service requests from the OSS/BSS module 32 (not shown in FIG. 3), and/or the service reporting module 80 reporting on the state of the VNFs (e.g., 58, 66, 68, 69, 71, 72), for example on a per-service-chain basis based on the interdependency indicators.

The orchestrator 12 of FIGS. 2 and 3 can track performance of each individual virtualized network function (VNF) 58, 62, 64, 66, within the VNF domain (i.e., VNF container) 60, based on receiving management messages, e.g., via a virtualized VNF manager (i.e., VNF manager container) 62; the orchestrator 12 can request the virtualized OSS/BSS domain controller 32*f* to execute a coordinated increase in capacity in the VNF domain 60 for each of the interdependent VNFs 58 associated with a given virtualized network service 54. Different types of virtualized network services 54 can be deployed according to the example embodiments, including virtualized network services having endpoints, and virtualized network services without endpoints (e.g., service brokers and/or translators). Example virtualized network services can include a Telepresence video conference session, a WebEx web meeting, streaming video, IP Multimedia System (IMS) session, an Evolved Packet System (EPS) Bearer session. For example, assume the orchestrator 12 in FIG. 2 initiates a new Evolved Packet System (EPS) service such as a mobile platform in a long term evolution (LTE) communications network: the orchestrator can allocate a virtualized Evolved Node B (eNodeB) 58*a*, a virtualized mobility management entity (MME) 58*b*, a virtualized Session Gateway (SGW) 58*c*, a virtual Customer Premises Equipment manager (CPE) 58*d*, and a virtualized packet gateway (PGW) 58*e*. As described in further detail below, the orchestrator 12 can set, within each container for the corresponding virtualized network function 58*a*, 58*b*, 58*c*, 58*d*, and 58*e* allocated for the specific virtualized EPS service 54, an interdependency indicator based on association with the virtualized EPS service 54. In other words, the interdependency indicator in each container can be used to establish interrelationships between the VNFs 58*a*, 58*b*, 58*c*, 58*d*, and 58*e* associated with a service chain, even though each VNF 58 normally would respond to requests only via the virtualized hardware elements (e.g., virtual machine, hypervisor, virtual switch, software defined network (SDN) controller) 61 in the network function virtualization instance (NFVI) 62. Hence, any virtualized VNF (e.g., 58*b*) can send an alert to a reporting module (80 of FIG. 3) indicating a need for more resources based on the interdependency indicator identifying to the virtualized VNF 58 (and/or any other resource polling the virtualized VNF 58) that it is interdependent with other VNFs, enabling the orchestrator 12 to request the OSS/BSS module 32*f* for a coordinated capacity increase for all the VNFs 58*a*, 58*b*, 58*c*, 58*d*, and 58*e* in the service chain, or any other VNF providing support for the service chain. The virtual infrastructure manager also can notify the orchestrator 12 of hardware-based capacity issues in either the virtual infrastructure elements 60 or physical hardware resource elements 34.

The identification between interdependent functions is based on setting an interdependency indicator within each container for a corresponding virtual network function associated with a virtual network service; in one embodiment, the interdependency indicator can be set in VNFs of a "service chain" (which can be implemented in the form of a serial chain topology, a star topology, or a bus topology) and any VNFs providing support for the service chain (e.g., billing interface, management, etc.). A "container" is defined as a definition of a particular executable function that can be executed, by a physical machine, as part of a virtualized service within a virtualized environment managed by a hypervisor, as opposed to a "bare metal" execution of the executable function directly by the physical machine. Examples of a physical machine can include a personal computer, a server computing element (e.g., "blade" server), a single or multiple processor core device implemented in a data center, etc. The "container" can have different forms, depending on the execution state of the corresponding executable function: if the execution state is inactive (e.g., shut down, suspended, hibernating, etc.), the container can be implemented solely as a data structure on one or more non-transitory physical media that includes any definitions, permanent and/or temporary application state variables, etc., that define the corresponding executable function at a prescribed application state; if the execution state is active, the container can be implemented as one or more executable instances of a virtualized executable function within an virtualized application runtime environment managed by a hypervisor, where the one or more executable instances can be executed on one or more physical machines according to the definitions, attributes, etc. stored in the data structure. Hence, an active container can be considered a Turing machine executing the operations defined in the corresponding data structure.

A container also inherits any and all hierarchal attributes associated with the particular executable function that it defines. Hence, as illustrated in FIGS. 2 and 3, a first container (e.g., 58a) can be "within" a second container (e.g., a first container inserted "within" the second container) (e.g., 60b) if the first container has a lower hierarchal order (i.e., lower hierarchal "layer") than the second container in an execution hierarchy, and the second container has a reference to the first container for execution of a prescribed virtualized operation associated with the at least a portion of a service provided by the second container. In other words, the first container can define at least one first executable operation required for execution of a second executable operation by the second container in the execution hierarchy. A first container can be considered as "within" a second container if both the first container and the second container share a common "domain" (e.g., administrative control, execution within the same physical machine, line card, rack, switching domain, data center, etc.) within a prescribed hierarchy; the first container also can be considered as "outside" and "below" the second container if the first container and the second container do not share the common "domain". As apparent from the description and accompanying drawings, the relationship between the first container and second container can vary depending on the type of hierarchy under analysis.

A fundamental problem associated with prior virtualizing of network functions is that the associated containers became "stateless" elements without knowledge of other virtualized network functions associated with a virtualized network service. In particular, a virtualized network function was considered "stateless" because it would only respond to a received request, where the request typically was from a container in a higher "level" of the hierarchy in a "North-South" computing system topology. In other words, a higher level container would contain a pointer for reachability to send a request to a lower-level container to perform a prescribed lower-level virtualized computing operation, and the request would contain sufficient information (e.g., IP address) to enable the lower-level container to send a response to the higher-level container. However, the lower-level container would have no knowledge of the higher-level container outside of the request initiated by the higher-level container, rendering the lower-level container incapable of initiating communications with the higher-level container.

Moreover, operations across multiple virtualized lower-level containers required a higher-level container to coordinate the sequence of requests and responses among each of the lower-level containers, such that lower-level containers were unaware of each other. Further, orchestrators to date were only involved with the creation of service by assigning lower-level containers (providing respective virtualized network functions) to a higher-level container providing the virtualized network service, with no consideration of the need for coordinated monitoring of the performance and needs for changes in capacity in the lower-level containers. Hence, any need for increasing capacity for a first virtualized network function associated with a virtualized network service was performed without regard to the need for a coordinated increase of capacity for other virtualized network functions associated with the same virtualized network service. Such uncoordinated increases in capacity could arise if different virtualized network services require different types of capacity increase (e.g., increase in bandwidth increase vs. increase in computer power capacity vs. increase in data storage capacity).

Figure 4:
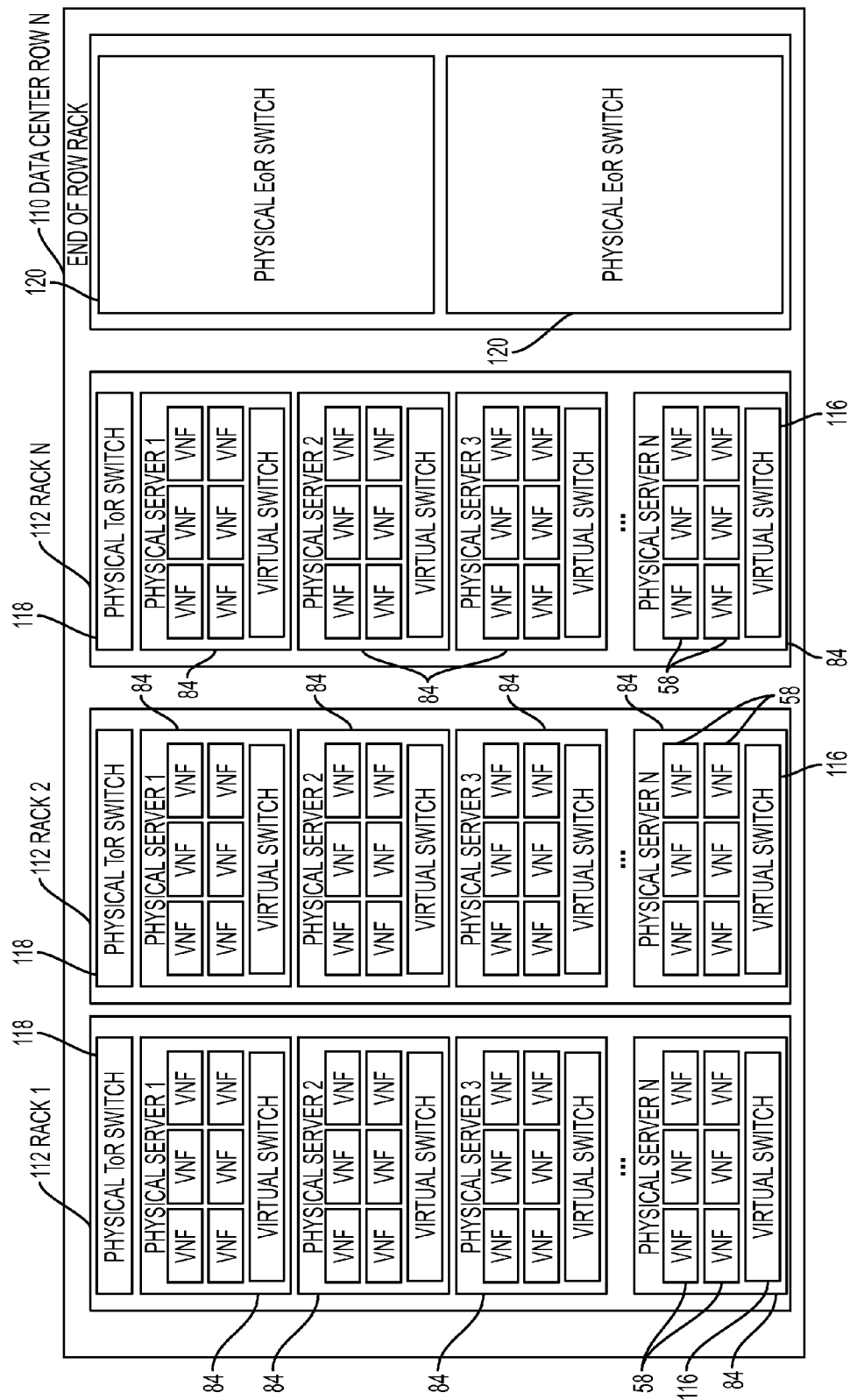
FIG. 4 illustrates an example implementation of a single row of a physical data center that can implement the example embodiments.

FIG. 4 illustrates an example implementation of a single row 110 of a physical data center having multiple physical rows 110 and that can implement the example embodiments. The following description of a data center that can implement virtualized network functions and virtualized network services according to example embodiments can help illustrate the complexity of allocating virtualized network functions for a virtualized network service, and the benefit of identifying interdependence among virtualized network functions (or attributes thereof).

Data center rooms typically are organized in multiple rows 110, with multiple physical racks 112 per row 110. Each physical rack 112 typically contains multiple physical servers 84, each representing physical resources upon which the orchestrator 12 can place (i.e., allocate, assign, etc.) a VNF (e.g., 58). Each server 84 also has a virtual switch (Vswitch) 116 configured for providing localized connections to (and between) the VNFs that reside on the physical server 84. Each rack 112 can include (e.g., at the top of the rack) a physical "Top of Rack" (ToR) switch 118, which provides the rack-level connectivity to (and between) the VNFs 58 that reside on different physical servers 84 within the corresponding rack 112. A multitude of racks 112 together comprise a row 110. Each row 110 in a data center can include at least one physical End of Row (EoR) switch 120, which provides aggregation of all ToR switches 118 and provides row-level connectivity for VNFs 58 that reside within the row on different racks 112.

The physical resources (e.g., compute, memory, and/or network) that are consumed to provide a virtualized network service are based on the placement of the associated VNFs 58 within the data center; in other words, more network resources are required to provide a virtualized network service if the interdependent VNFs are placed within physical servers 84 that are further apart topologically within a data center, Ideally, all VNFs 58 for a particular virtualized service would reside on the same physical server 84, such that the communication flows between the VNFs 58 of the same service would be limited to only involve the Vswitch 116 in the same physical server 84; however, placement of all VNFs 58 associated with a particular virtualized service within a single physical server 84 may not always be possible due to limited resources within the single physical 84.

The next ideal scenario is for all VNFs 58 associated with a particular service to reside on the same physical rack (e.g., "Rack 2") 112, which limits communication flow between VNFs 58 of the same virtual service to involve the corresponding ToR switch 118 for that rack (e.g., "Rack 2") 112, and the number N×Vswitches 116 associated with the servers 84 for the N VNFs 58. However, because there are limited resources within a single rack 112, allocating all VNFs 58 within a single rack 112 may not always be possible.

A less ideal scenario is when VNFs 58 associated with a particular virtualized service reside on different racks (e.g., "Rack 1" and "Rack N") 112 within the same row 110. The communication flow between the VNFs 58 for the same virtual service now involve the EoR switch 120 for that row 110, M×ToR 118 switches (one for each rack 112 containing an associated VNF 58) and N×Vswitches 116 associated with the servers 84 for the N VNF 58. However, because there are limited resources within a single row 110, this allocation within a single row 110 may not always be possible.

An even less ideal scenario is when VNFs 58 associated with a particular virtualized network service reside on different rows 110 within the same data center. The communication flow between the VNFs associated with the same virtual service now involve L×EoR switches 120 (one for each row 110 containing an associated VNF 58), M×ToR switches 118 (one for each rack 112 containing an associated VNF 58), and N×Vswitches 116 associated with the physical servers 84 for the N VNFs 58.

The orchestrator 12 is responsible for limiting the number of physical resources involved in the implementation of the virtual service, and ensure that interdependent VNFs 58 are located in such a way to minimize implications to ToR switches 112 and EoR switches 120 (i.e., minimize the use of the ToR switches 112 and/or EoR switches 120 for execution of a given virtualized network service). In the case of a distributed architecture that utilizes multiple physical data centers connected by wide area network (WAN) circuits, the management by the orchestrator becomes even more complex.

According to example embodiments, the orchestrator executed by a physical machine (FIG. 5) not only can allocate virtualized network functions for creation of a virtualized network service, but the orchestrator also can identify each of the virtualized network functions as inderdependent for coordinated execution of the virtualized network service, based on setting by the orchestrator an interdependency indicator within each virtualized container associated with providing a corresponding virtualized network function for the virtualized network service. The interdependency indicator can create a "stateful" condition in the virtualized container, enabling the virtualized container to utilize the interdependency indicator as a "pointer" toward a virtualized management entity associated with the virtualized network service.

The virtualized management entity, executed for example as part of the orchestrator (e.g., the service reporting module 80 of FIG. 3), can receive information associated the performance of the virtualized container within the context of the virtualized network service; hence, the orchestrator 12 can monitor the performance of each virtualized network function within the context of the virtualized network service, and execute coordinated changes among the virtualized network functions associated with the virtualized network service. Hence any capacity changes required by a given virtualized network function can be coordinated among the interdependent virtualized network functions by the virtualized management entity.

In another embodiment, a network orchestration function, can be aware of the type of network function being virtualized, and can establish requests to a Cloud Orchestrator at a different hierarchal level. The Network Orchestration Function can assign unique Virtual Machines to well-understood network functions. A cloud orchestration layer, which resides above the Network Orchestration Function, can remain unaware of the nature of the Virtual Network Function, and only need be interested in the set of requirements for the Virtual Network Function. In another embodiment, the network orchestration function and cloud orchestration function can be "collapsed" into a single orchestration function.

In a mobile environment, this interdependence can be seen between such virtualized nodes as a MME 58*b*, SGW 58*c*, PGW 58*e*, a Home Subscriber Server (HSS) (not shown), and a Policy and Rules Charging Function (PCRF) (not shown), all of which scale multidimensionally based on subscribers, sessions, and control-plane events. In the case of bearer nodes, such as SGW and PGW, scale is also based on features and throughput.

Hence, particular embodiments can identify within a virtual container the interdependence of specific software elements. In the case of Network Function Virtualization, being defined by the European Telecommunications Standards Institute (ETSI), the example embodiments can define interdependent Virtualized Network Functions and allow the management system to determine the appropriate interdependent scaling attributes between these virtualized network functions.

Figure 5:
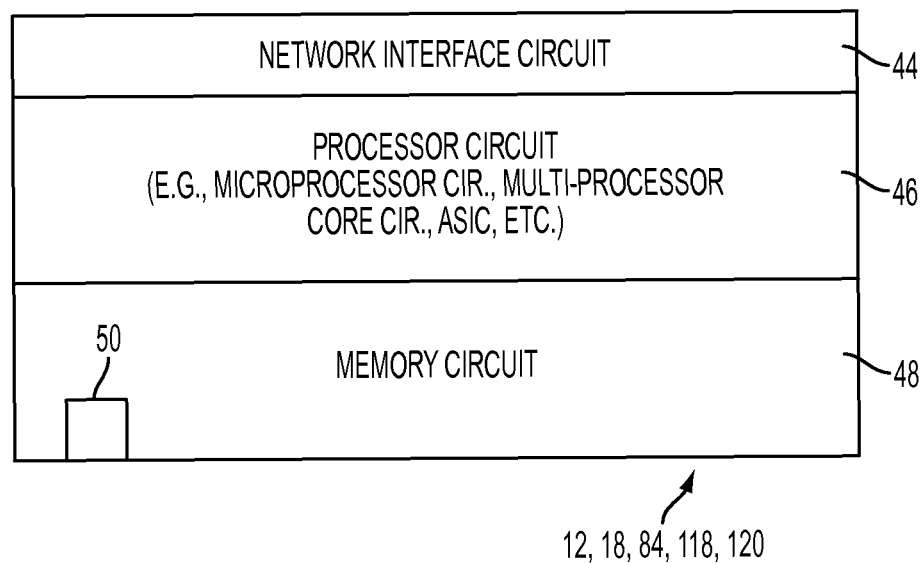
FIG. 5 illustrates an example apparatus for executing any one of point-and-click advertisement and request of virtualized network services, or deployment of the virtualized network services, according to an example embodiment.

FIG. 5 illustrates an example implementation of a machine 14 configured for executing any one of the disclosed virtual elements, including the orchestrator 12 or the consumer portal 18. FIG. 5 also illustrates any one of the physical devices 84, 86 (e.g., FIG. 3 or 4), 118 and/or 120 (e.g., of FIG. 4), 28, 132, 134 (e.g., FIG. 8). The apparatus 14, 28, 84, 118, 120, 132, and/or 134 can include a network interface circuit 44, a one or more processor circuits 46, and a memory circuit 48. The network interface circuit 44 can include one or more distinct physical layer transceivers for communication with any one of other devices 84, 86, and/or 88 of FIG. 3; the network interface circuit 44 also can include an IEEE based Ethernet transceiver for communications with the devices of FIG. 3 via a wired Ethernet link, and/or a fiber optic transceiver, etc. The processor circuit 46 can be configured for executing any of the operations described herein, and the memory circuit 48 can be configured for storing any data as described herein.

Any of the disclosed circuits of the apparatus 12, 14, 28, 84, 118, and/or 120 (including the network interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 6A:
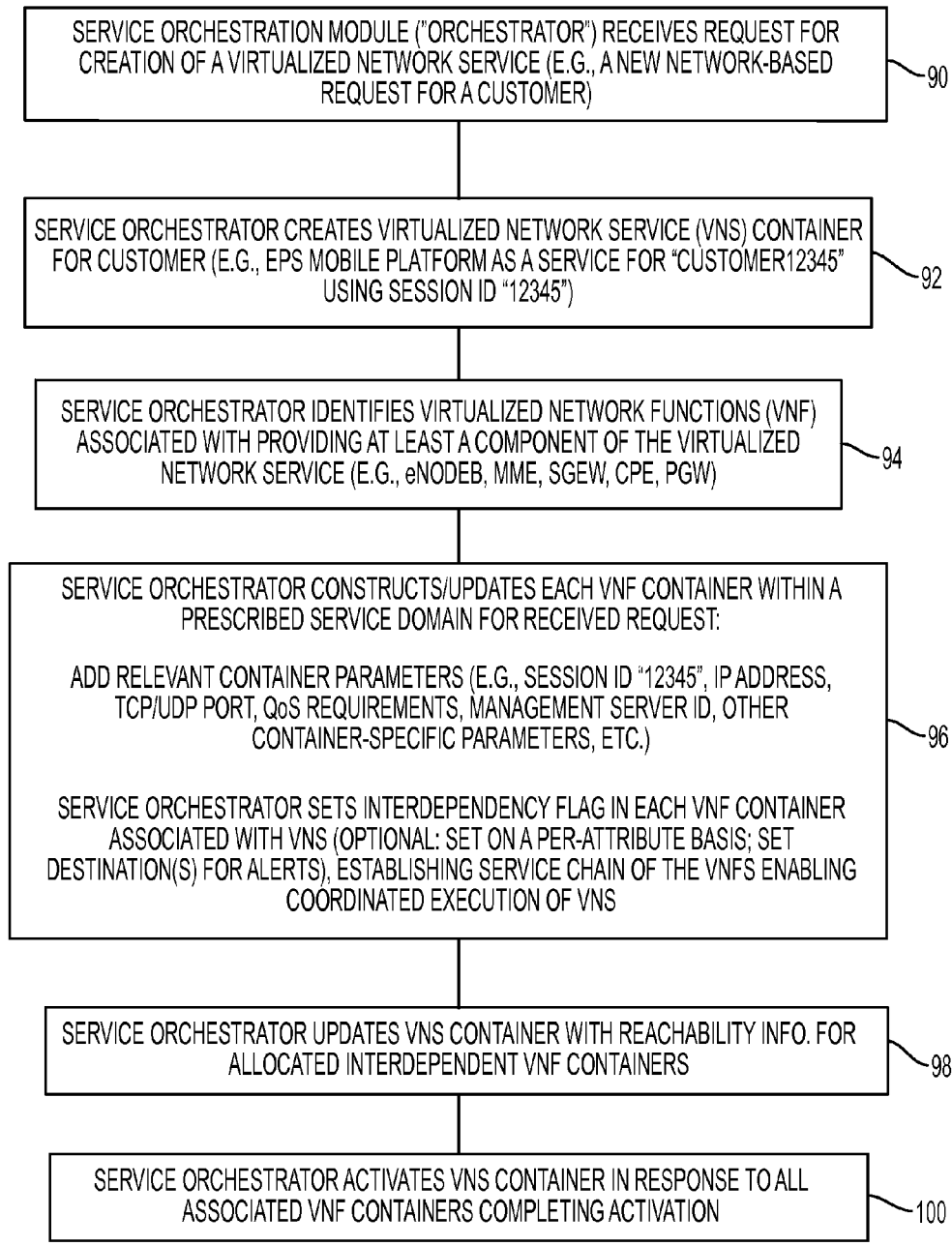
FIGS. 6A and 6B illustrate an example method by the orchestrator of defining interdependent virtualized network functions for service level orchestration of a virtualized network service for a customer, according to an example embodiment.
Figure 6B:
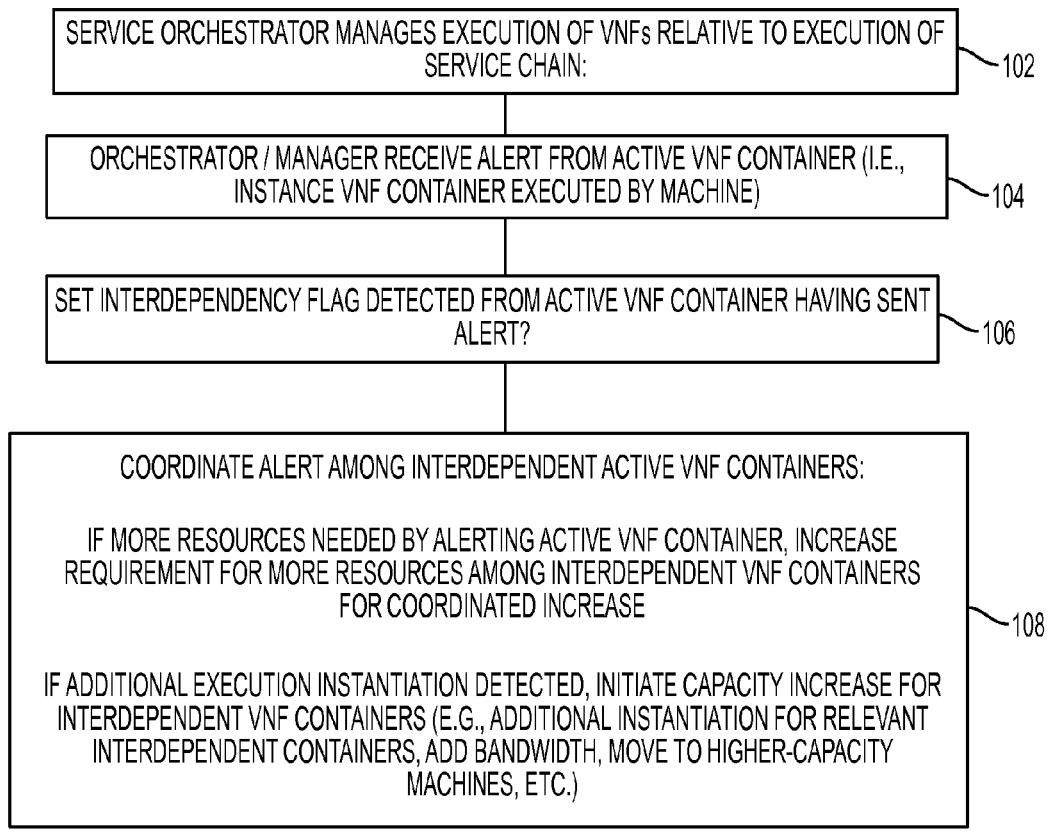

FIGS. 6A and 6B illustrate an example method by the orchestrator of defining interdependent virtualized network functions for service level orchestration of a virtualized network service for a customer, according to an example embodiment. The operations described with respect to any of the Figures can be implemented as executable code stored on a computer or physical machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the physical machine-based hardware components as described herein; to the contrary, other physical machine-based hardware components can be used to execute the disclosed operations in any appropriate order, or at least some of the operations in parallel.

The service orchestration module (i.e., the network orchestrator) 12 in operation 90 can receive a request for creation for a virtualized network service 54, for example a new network request in the form of a container 16 from a customer portal 18 (FIG. 1). The service level orchestrator 12 in operation 92 can create a virtualized network service (VNS) container for the customer, including for example a customer number, session identifier, etc. The service level orchestrator 12 also can identify in operation 94 any virtualized network functions (VNFs) from the VNF domain 60 that are required for implementation of the virtualized network service. As part of the provisioning operation, the service level orchestrator 12 in operation 96 can construct and/or update each VNF container for any required VNFs from the VNF domain 60 with any necessary parameters or requirements.

The network orchestrator 12, as part of service creation, can specify in operation 96 any one or more of the following requirements in a container for a virtualized operation: Compute Resources; Storage Resources and Type (IMDB, SAN, Disk, SSD); Memory Resources (RAM) (in the case of IMDB, memory resources may be tied to storage); L2/L3 Virtual Interface (Bandwidth, number of VLAN identifiers, number of IP Address Pool, throughput); I/O Resources (Bandwidth to storage, to management plane, to bearer plane, etc.); QoS (MBR, GBR, Latency, jitter, etc.); physical, network, and/or virtual location information; Load-balancing request (across multiple VMs); Elasticity Requests or requirements for auto-scaling. The network orchestrator 12 also can add session IDs, IP addresses, TCP/UDP ports, QoS Requirements, manager server ID (e.g., to send notification messages regarding management flags, SNMP traps, capacity alarms, etc.), as well as other container-specific parameters.

The network orchestrator 12 also in operation 96 can set an interdependency indicator in each VNF container associated with the virtualized network service 54: if necessary, the interdependency indicator can be set on a per-attribute basis, especially if different alerts require additional capacity of different types or dimensions (e.g., move to larger machine to increase compute or storage, increase bandwidth or QoS, etc.). In other words, the network orchestrator 12 can set a first interdependency indicator for "direct interdependence" between attributes of the same or similar types, for example where the first interdependency indicator can indicate that scaling a bandwidth on VNF1 (e.g., 58d) affects scaling bandwidth on VNF2 (e.g., 58e); the network orchestrator 12 also can set a second interdependency indicator for "indirect interdependence" between attributes of different types, for example the second interdependency indicator set for a first attribute of a first attribute type (e.g., network bandwidth) in a first VNF container 58b can identify an interdependence with a corresponding set second interdependency indicator for a second attribute of a second attribute type (e.g., storage/memory requirement) in a second VNF container 58c. Each interdependency indicator can be implemented in various forms, for example a simple "bit"

flag, a bit mask, and/or a unique value that uniquely defines the interdependency indicator within the virtualized network service 54, etc. Other protocol-specific indicators can be used to ensure the orchestrator 12 is aware of the interdependency between virtualized network functions. Hence, virtualized network functions can be identified as interdependent based on their respective containers having the same interdependency indicator (e.g., same bit flag, same corresponding bit within a bit mask, same indicator value, etc.).

Interdependency between virtualized network functions (and/or between attributes of different VNFs) can be known by the network orchestrator 12 before the creation of the virtualized network service 54, for example based on prescribed definitions of the virtualized network service 54, the VNFs 58, and/or any of the associated attributes. Interdependency between virtualized network functions (and/or between attributes of different VNFs) also can be determined (e.g., "learned") by the network orchestrator 12 during and/or after service creation based on the network orchestrator 12 monitoring the virtualized network service 54. Hence, the orchestrator in operation 96 can define a service chain 60 (e.g., in FIG. 7) of the VNFs 58 for coordinated execution of the virtualized network service.

The network orchestrator 12 in operation 98 can update the VNS container with the reachability information for the allocated interdependent VNF containers, enabling identification of the VNFs 58 associated with the specific VNS session 54. The orchestrator 12 in operation 100 can activate the VNS container for service in response to detecting all the associated VNF containers have completed activation.

Referring to FIG. 6B, the Network Orchestration Function 12 is enabled in operation 102 to understand (either through derived logic, such as analytics, or directly, through programming) the interdependence between particular virtual network functions, and manage execution of the VNFs relative to the execution of the service chain 60. In a mobile environment, for example, the Network Orchestration Function is enabled to understand the correlation of bandwidth between the SGW and PGW, or the correlation between memory resources between SGW, PGW, and MME, or further to understand the transaction scale correlation between the HSS and SPR.

For example, in operation 104 the orchestrator 12 (e.g., the service reporting module 80 of FIG. 3) can receive an alert from an active VNF container. If in operation 106 the application decision making module 70 detects the alert is from an active VNF container having an interdependency indicator, the application decision making module 70 can coordinate the alert in operation 108 among the interdependent active VNF containers (e.g., across all the applications 60*a*, 60*b*, 60*c*, and/or any of the elements 58, 66, 68, 69, 71, 72, etc.). For example, if more resources are needed, the requirement for more resources can be increased multidimensionally across all the interdependent VNF containers for a coordinated increase in capacity. For example, if additional instantiation is needed for a given VNF container, a corresponding increase of capacity is initiated across the interdependent containers.

Figure 7:
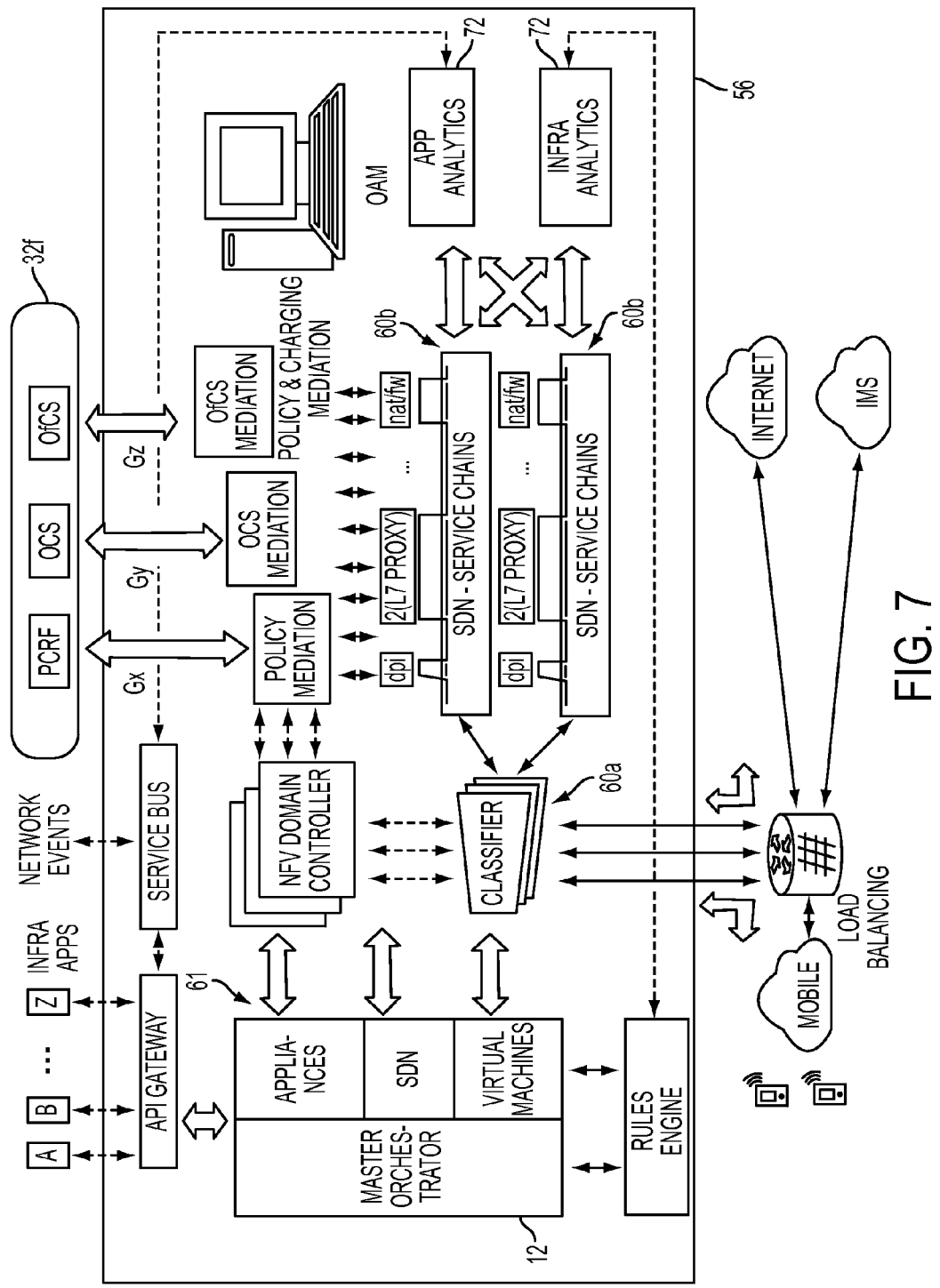
FIG. 7 illustrates an example architecture of a virtualized service gateway in a telecommunications network based on the orchestrator of FIG. 1 defining interdependent virtualized network functions, according to an example embodiment.

Hence, the orchestration module can provide a coordinated increase of all virtualized network functions associated with a collection of different virtualized network services, even if the virtualized network functions associated with a virtualized service chain 60 need to be moved to new hardware devices. As illustrated in FIG. 7, the numerous virtualized functions associated with the virtualized IP services 56 can have increased capacity in a coordinated manner, including the classification functions 60*a*, service chains 60*b* providing various operations (e.g. YouTube streaming, etc.) using coordinated virtualized operations such as deep packet inspection (dpi), layer 2-7 proxy operations, and Network Address Translation/Firewall (nat/fw) operations. Other operations associated with the IP services 56, including analytics 72 that are identified as interdependent with the operations 60, etc. also are provided coordinated execution of management operations.

According to example embodiments, coordinated scaling of virtualized network functions ensures an entire virtualized network service can be scaled as needed. Different modifications and variations can be employed, described below.

In another embodiment, the Virtual Network Function when distributed over multiple VM can make use of an application level load balancing that shall take account of many of the KPI as stated above to make full and effective use of the available resources yet shall not be responsible for establishing additional Virtual Machine entities.

The Network Orchestration Function is operable to support this interdependency indicator on a per-attribute basis, and alert the Cloud Orchestrator when there are dependencies between particular Network Functions contained within Virtual Machines.

The Cloud Orchestrator is operable to notify the Network Orchestration Function of the assignment of particular Virtual Machine identifiers to particular requests such that the Network Orchestration Function can map virtual topologies.

When the Network Orchestration Function makes a request to the Cloud Orchestrator for the establishment or modification of a particular Virtual Machine, specific dependencies are identified (with the Interdependency Indicator identifying the attribute, and which other VMs the dependency exists with), such that appropriate actions can be taken.

In the case of VM establishment, the Cloud Orchestrator monitors KPI thresholds, rate of change of application protocol level messaging, overload and error indicator codes, operator policy and may compare the requested resource assignment with that of interdependent Network Function and make determination as to whether the request should be accepted, whether the request triggers modification of existing virtual machines, or whether the request should be rejected.

VM establishment requests which contain a load-balancing or auto-scale request require an additional orchestration event—in which the Cloud Orchestrator determines whether the stepwise increased capacity (load-balancing) or the dynamic capacity scale is one that the interdependent Virtual Machines are able to support. For instance, a load-balancing request may trigger the establishment of a new interdependent virtual machine and a similar load-balancing model to be established. An Auto-scale request may trigger the modification of existing interdependent Virtual Machines to also be auto-scale enabled. Such decision criteria are left to the logic inherent in the Cloud Orchestrator; however, the example embodiments seek to provide the interdependency information for decision logic to be implemented.

In the case of VM modification, the Cloud Orchestrator may determine whether other VMs should be scaled down to free stranded capacity or scaled up to support additional capacity.

In the case of VM deletion, the Cloud Orchestrator may determine whether other VMs should be scaled down or deleted to free stranded capacity.

In one embodiment, the Network Orchestration Function is combined (i.e., collapsed) with the Cloud Orchestration Function, allowing the Cloud Orchestration Function to be aware of, and track state of, interdependent network functions.

Figure 8:
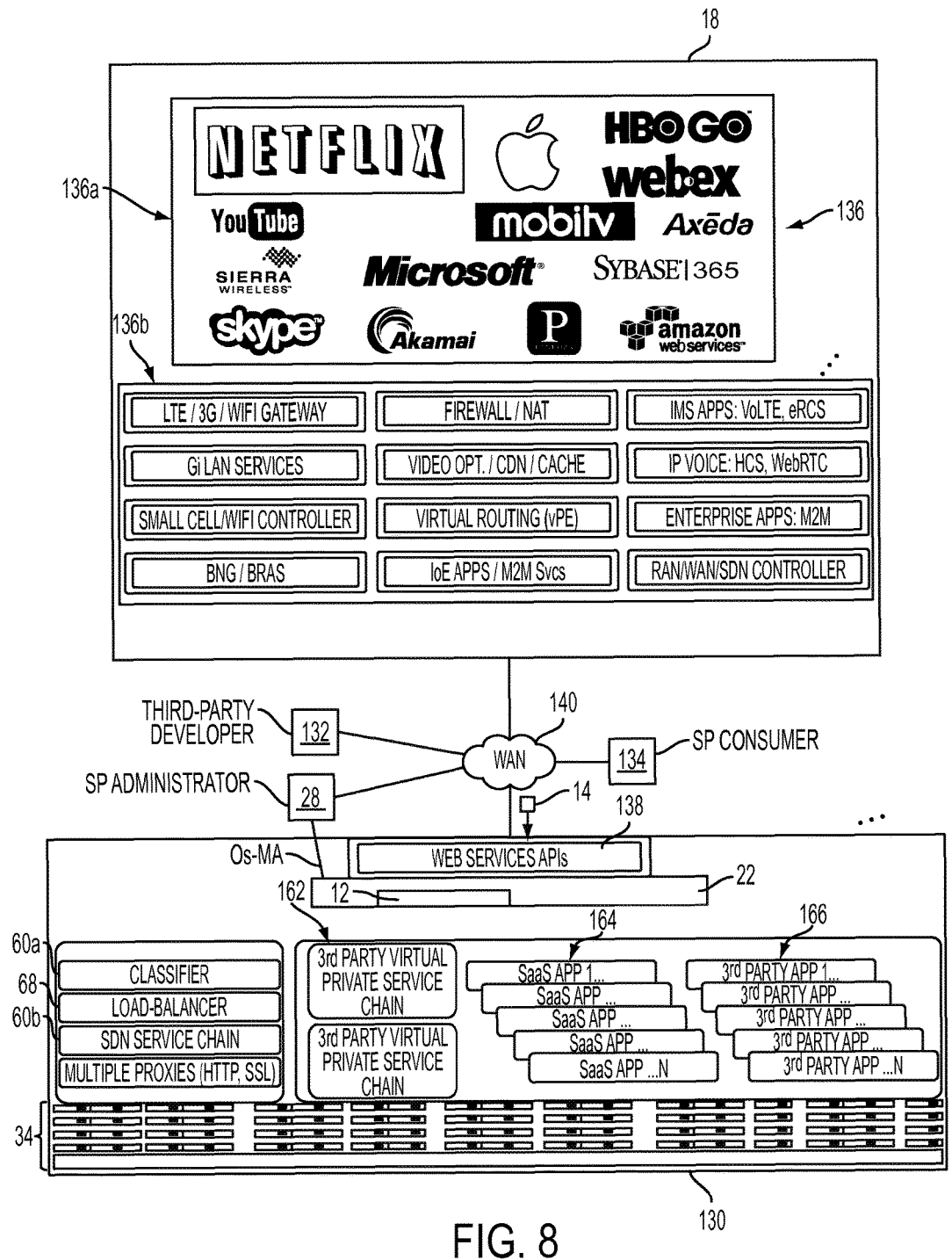
FIG. 8 illustrates example available virtualized network services advertised by an apparatus as an "app store", for point-and-click deployment of virtualized network functions and/or virtualized network services in a host service provider, according to an example embodiment.

Digital Distribution Platform (App Store Portal) for "Point-and-Click" Deployment of VNFs/VNSs in a Host Service Provider FIG. 8 illustrates example available virtualized network services advertised by an apparatus (e.g. of FIG. 5) as an "app store" 18, for point-and-click deployment of virtualized network functions and/or virtualized network services in a host service provider, according to an example embodiment. Since a virtualized network service (e.g., 54 of FIG. 2) can include one or more virtual network functions (e.g., 58 of FIG. 2) executed within a prescribed network infrastructure 34, the virtualized network functions and virtualized network services as described with respect to FIGS. 8 and 9 can be referred to generally as virtualized network services 136. The "app store" 18 can provide a web-based portal ("app store portal") that enables the distribution and "point-and-click" deployment of virtualized network services 136 within a host service provider 130.

The app store 18 can utilize standardized interfaces between the app store 18 and different entities that communicate with the app store 18 via a wide area network (WAN) 140, including vendor interface devices 28 and/or 132, consumer interface devices 134, and web-based application programming interfaces (APIs) 138 of the host service provider 130. For example, a vendor can include a third party software developer/vendor 132 offering virtualized network services 136a that are distinct and independent from any service provider 130. Example third-party virtualized network services 136a can include "carrier edge" applications executed at the edge of a service provider network 130, for example Netflix Open Connect, Google Global Cache (GGC), Apple Siri, Amazon Web Services, Microsoft Skype, HBO GO®, Axeda for Machine to Machine (M2M) or Internet of Things (IoT) connectivity, Cisco WebEx, Pandora, YouTube, etc.

Another type of vendor can include an administrator 28 of the host service provider 130, where instead of manually deploying service provider-specific virtualized network services 136b via an internal interface (e.g. Os-Ma of FIGS. 2 and 8), the administrator 28 can "publish" in the app store 18, via the wide area network 140, selected virtualized network services 136b that are specifically implemented for the specific host service provider 130. Example virtualized network services 136b can include virtualized mobile network services (e.g., LTE/3G/WiFi Gateway, GI-LAN Services, Voice over LTE (VoLTE), etc.), Platform as a Service (PaaS) and/or Software as a Service (SaaS) based services (e.g., Firewall/NAT, virtual routing, Machine to Machine (M2M) services), software defined network (SDN) services, etc. Hence, a service provider administrator 28 can submit its own service provider-specific virtualized network services 136b to the app store 18 via the WAN 140 according to prescribed certification requirements, for sale and distribution worldwide (e.g., via a wide area network). The app store 18 also can provide different virtualized network services 136b for different service providers 130 (e.g., AT&T, Verizon, Comcast, T-Mobile, U.S.-Cellular, Sprint, etc.) in the same or different geographic or jurisdictional regions.

Service provider consumers (e.g., enterprise-class customers and/or end customers subscribing to services offered by a host service provider 130) 134 can communicate with the app store 18 to request deployment of a selected virtualized network service 136 in a host service provider. For example, a consumer 134 can send a request to initiate a new or additional wireless telephony service, Internet Service Provider (ISP) service, Video on Demand service, bundled data services (e.g., Verizon FIOS), etc., without the necessity of contacting a representative of the host service provider 130.

The app store 18 can communicate with web-based application programming interfaces 138 of the host service provider 138, for retrieval of information associated with the app store 18 generating a service container specifying instructions for deployment of a virtualized network service 136 by the host service provider 130. For example, the app store 18 and the APIs 138 can exchange information based on prescribed interfaces: example prescribed interfaces can include interfaces pursued by ETSI NFV ISG working groups for the architecture, requirements, and capabilities of a NFV platform, associated software Virtual Network Functions (VNFs), and the management and orchestration, namely the INF (Infrastructure Architecture and capabilities) working group, the SWA (Software Architecture and capabilities) working group, and the MANO (Management and Orchestration) working group.

Hence, the prescribed interfaces between the app store 18 and the API 138 enables the app store 18 to generate a query to the web services 138 for details regarding VNFs, policies, available deployment locations, etc., for deployment of a virtualized network service 136 according to generic requirements for the virtualized network service. The web service APIs 138 can respond to the generic queries for generic requirements (e.g., "high-bandwidth and low memory", "low-bandwidth and high memory", or "high-bandwidth and high memory", etc.) having prescribed minimum (and/or maximum) values for virtualized network services based on interactions with the orchestrator 12 within the service orchestration 22: as described previously with respect to FIGS. 1-7, the orchestrator 12 can identify the interdependent virtual network functions required for a given virtualized network service 136; hence, the orchestrator 12 also can determine, in response to the query from the app store 18, any necessary virtual network functions, selected deployment locations within the network infrastructure 34, any necessary policies, etc., that are required for deployment of the generic requirements specified in the query from the app store 18. Example policies can include the requirement for a virtualized firewall for any third party virtualized network service 136a not deemed secure by the host service provider 130 (e.g., any third party virtualized network service (or application) 136a not having received a provider-specific security certification from the host service provider 130).

Hence, the web services APIs 138, in response to receiving a query from the app store 18 and that specifies generic service requirements for a virtualized network service 136, can generate and output a response that specifies requirements for deployment of the specified generic service requirements associated with a virtualized network service 136: the response can specify any virtualized network functions and/or policies required by the host service provider 130, and/or an identification of available deployment locations within the network infrastructure 34. The response output by the web services APIs 138 and received by the app store 18 (via the WAN 140) enables the app store 18 to create the service request (containing the service container 16, see FIG. 1) defining the deployment of the selected virtualized network service at one or more selected deployment locations among the available deployment locations in the host service provider 130.

Figure 9A:
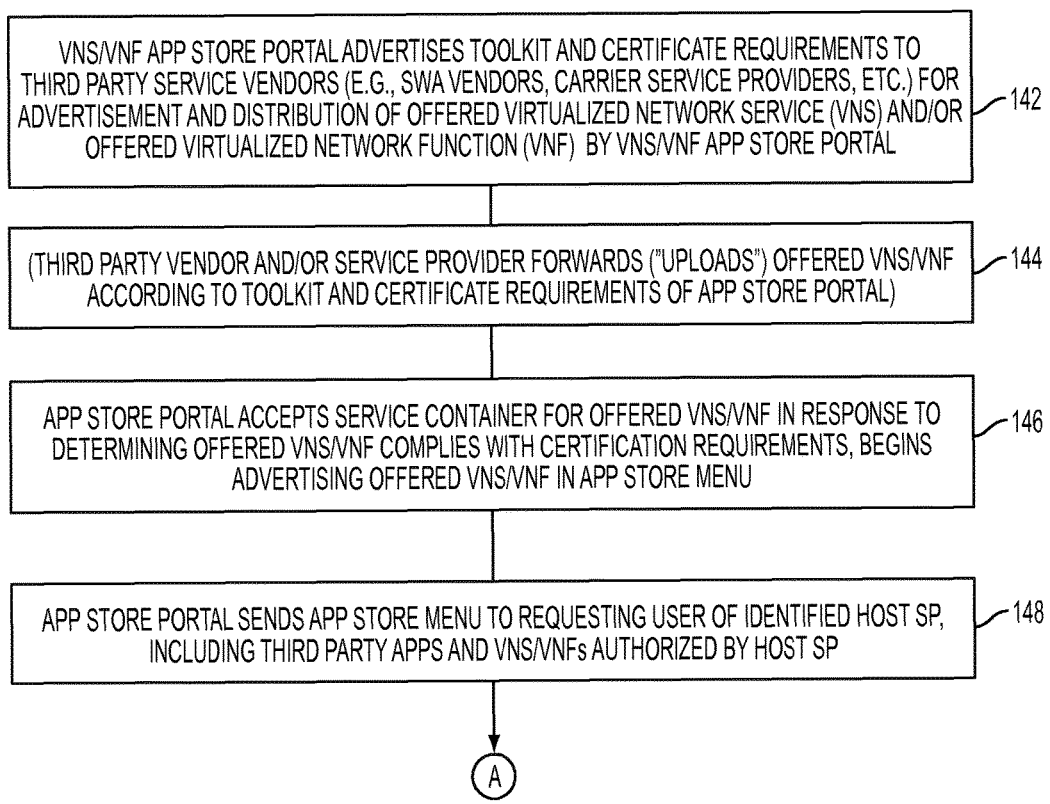
FIGS. 9A and 9B illustrate an example method by the apparatus of FIG. 8 in providing point-and-click deployment of virtualized network functions and/or virtualized network services, according to an example embodiment.
Figure 9B:
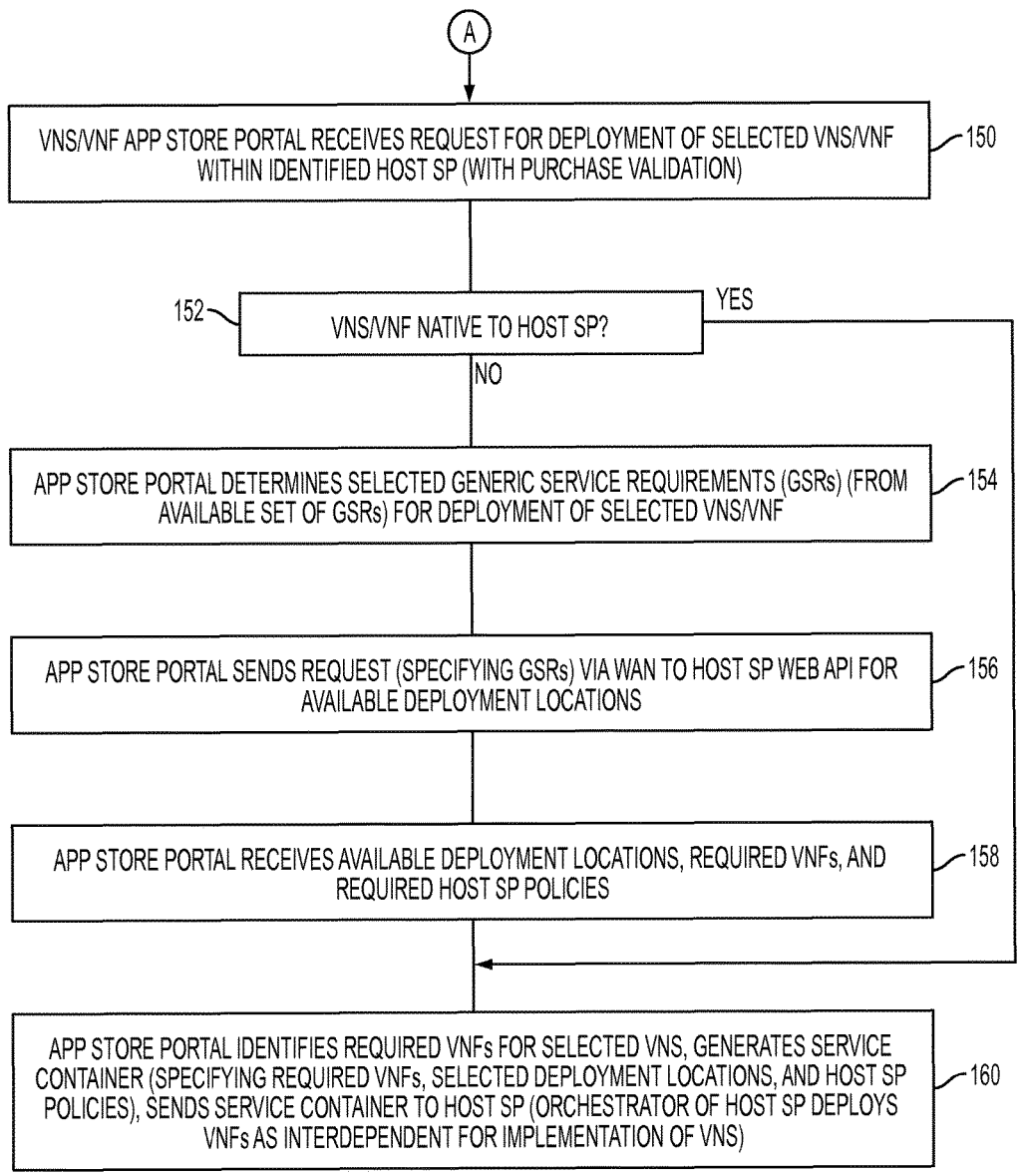

FIGS. 9A and 9B illustrate an example method by the apparatus 18 of FIG. 8 (illustrated as an app store portal) in providing point-and-click deployment of virtualized network functions and/or virtualized network services, according to an example embodiment. As described previously, the operations described herein can be implemented as executable code stored on a computer or physical machine readable non-transitory tangible storage medium (e.g., 48 of FIG. 5) that are completed based on execution of the code by a processor circuit (e.g., 46 of FIG. 5); the operations described herein also can be implemented as executable logic that is encoded in one or more non-transitory tangible media for execution. As apparent from the foregoing, the app store 18 can be executed by the processor circuit 46 of FIG. 5 within a virtualized environment.

Referring to operation 142, the processor circuit 46 executing the app store portal 18 can advertise toolkit and certificate requirements to third party service vendors, for example third party developers 132 desiring to offer a third party virtual network service 136*a* in place of a dedicated hardware server providing the same network service; the toolkit and certificate requirements also can be advertised to administrators 28 of service providers 130, enabling the administrators 28 to "publish" selected virtualized network services 136*b* that are specifically implemented for the specific host service provider 130. Hence, the toolkit and certificate requirements can specify prescribed interfaces or standards (e.g., compliant with MANO, SWA, and/or INF, etc.), security agreements, subscription agreements, etc., required for a developer 28, 132 to "upload" in operation 144 the offered VNS 136 via the WAN 140 for advertisement and distribution of the offered VNS 136 among the available virtualized network services. The offered VNS 136 is "uploaded" in the form of a service container that specifies the requirements for deployment of the offered VNS 136 according to the prescribed interfaces or standards required by the app store 18 in operation 142.

The processor circuit 46 executing the app store portal 18 in operation 146 can accept the service container defining the offered virtualized network service 136, based on the app store portal 18 determining that the offered virtualized network service 136 and the service vendor supplying the offered virtualized network service 136 (e.g., 28 and/or 132) comply with the certification requirements. The app store portal 18 in operation 146 can begin advertising the "uploaded" offered virtualized network service 136 within an app store menu available to consumers 134 using a web-based portal service reachable via the WAN 140.

The processor circuit 46 executing the app store portal 18 in operation 148 can receive (via the corresponding network interface circuit 44 of FIG. 5) a request via the WAN 140 from a consumer 134 of the available virtualized network services advertised by the app store portal 18. The app store portal can determine, from the request, the host service provider 130 utilized by the user from among available service providers (e.g., AT&T, MCI, Verizon, Comcast, T-Mobile, U.S.-Cellular, Sprint, etc.), in order to ensure that the user receives a listing of only the available virtualized network services (136) that are authorized by the host service provider 130; in other words, if the app store 18 determines that the service provider consumer 134 is a Verizon customer (and not a subscriber to T-Mobile or AT&T), the app store 18 in operation 148 can send to the requesting user 134 only the virtualized network services 136 that are authorized by the host service provider (e.g., Verizon) 130. Hence, the consumer 134 would not receive a listing of any provider-specific virtualized network services 136*b* of other carriers (such as T-Mobile or AT&T), nor would the consumer 134 receiving a listing of any third party virtualized network services 136*a* that are not authorized by the host service provider (e.g., Verizon) 130, in order to ensure enforcement of security policies by the host service provider 130 (note a host service provider 130 may permit an "unauthorized" third party VNS 136*a* that is deployed behind a virtualized firewall).

Referring to FIG. 9B, the processor circuit 46 executing the app store portal 18 can receive in operation 150 a request for deployment of a selected one of the available virtualized network services (e.g., Netflix Open Connect) 136 advertised by the app store portal 18. The request can identify the host service provider (e.g., Verizon) that is to deploy the selected one virtualized network service 136; as described previously, the request can be from a consumer 134 of the host service provider 130 (providing the appropriate purchase validation) and/or an administrator 28 using the app store portal 18 as an alternative to conventional provisioning using OSS provisioning.

The processor circuit 46 executing the app store portal 18 in operation 152 can determine if the virtualized network service 136 is a provider-specific virtualized network service 136; a provider-specific virtualized network service 136*b* can have all available deployment locations, service provider policies, listing of required virtualized network functions already specified within the container maintained by the app store 18 for the provider-specific virtualized network service 136*b*, eliminating the necessity of sending a query to the web service APIs 138 in operations 143, 156, and 158. Assuming no queries are needed from the web service API, the app store portal 18 can identify (from corresponding container for the chosen provider-specific virtualized network service 136*b*) the required virtual network functions, selected deployment locations, and any host service provider policies, and send the service request 14 (containing the service container 16, see FIG. 1) in operation 160 for deployment of the chosen provider-specific virtualized network service 136*b* by the orchestrator 12. As described previously, the orchestrator 12 of the host service provider 130 can deploy the required virtual network functions as interdependent for implementation of the chosen provider-specific virtualized network service 136*b*. Further details of operation 160 are provided below.

If in operation 152 the processor circuit 46 executing the app store portal 18 determines that the virtualized network service is not native to the host service provider 130 (e.g., is a third party virtualized network service 136*a* such as Netflix Open Connect), the processor circuit 46 executing the app store portal 18 can determine in operation 154 selected generic service requirements (GSRs), from an available set of generic service requirements, that are required for deployment of the selected one virtualized network service 136. In particular, the service container that defines the selected one virtualized network service 136 can specify the generic service requirements that are needed (e.g., according to the MANO, SWA, and/or INF specifications, or according to any other prescribed specification), enabling the app store portal 18 in operation 156 to send a query to the web services APIs 138 of the host service provider 130.

The query generated by the processor circuit 46 executing the app store portal 18 to the APIs 138 can specify the selected generic service requirements that are needed for the one virtualized network service (e.g., Netflix Open Connect) 136; the query also can include a request for an identification of available deployment locations within the network infrastructure 34.

As described previously, the orchestrator 12 of the host service provider 130 can respond to the query with a response that enables the processor circuit 46 executing the app store portal 18 to generate the service request 14 for deployment of the chosen virtualized network service 136. Hence, the processor circuit 46 executing the app store portal 18 in operation 158 can receive, from the prescribed application programming interface 138, the available deployment locations, the virtualized network functions required by the host service provider 130 (e.g., 58, 66, 68, 69, 71, 72 of FIG. 3) for implementation of the one virtualized network service, and policies required by the host service provider for the one virtualized network service 136 (e.g., WebEx 54 of FIG. 2), enabling the app store portal 18 to create in operation 160 the service request 14 for deployment of the one virtualized network service at the selected deployment locations.

The processor circuit 46 executing the app store portal 18 in operation 160 can generate the service request 14 based on information specified in the original service container uploaded by the developer 28 and/or 132, any request parameters from the request from the consumer 134, and any response from the API 138 of the host service provider 130. As illustrated in FIG. 8, the service request 14 can be for deployment of any one of a third party virtual private service chain 162, a Software as a Service (SaaS) application 164, and/or a third party application 166. The app store portal 18 in operation 160 can identify the required virtualized network functions (e.g., 58, 66, 68, 69, 71, 72 of FIG. 3) to be specified in the service request 14, for example from the response output by the APIs 138; the app store portal 18 thus can create SDN service chains 162 with associated policies based on the standardized interfaces prescribed by the APIs 138 (e.g., INF, SDN, etc.). The app store portal 18 also can specify, in the service request 14, selected deployment locations from among the available deployment locations identified in the response from the APIs 138, and can specify any necessary host service provider policies, for example load balancing policies for distributing network traffic across multiple physical and/or logical boundaries, firewall policies, security and/or billing policies, etc. The app store portal 18 also can add any additional MANO events, instructions, etc., necessary for deployment of the host service provider 130.

The processor circuit 46 executing the app store portal 18 outputs in operation 160 the service request 14, via the wide area network 140, to the web service APIs of the host service provider 130, enabling the orchestrator 12 of the host service provider 130 to deploy the selected one virtualized network service 136 as described above with respect to FIGS. 1-7. If the orchestrator 12 determines that any one of the virtualized network functions is not available (e.g., a virtual firewall is not available for the selected one virtualized network service 136), the orchestrator 12 can send an alert to the app store portal 18 that the request specified in the service container 18 cannot be deployed (alternately the alert can be sent by the API 138 as part of the response received by the app store portal 18 in operation 158).

According to example embodiments, an app store portal provides a "point-and-click" deployment of third-party virtualized network functions to one of multiple available host service providers, based on standardized interfaces (e.g., ETSI NFV ISG interfaces in MANO, INF, and/or SWA working groups) that enable worldwide distribution of virtualized network functions in service provider networks. The "point-and-click" deployment of third-party virtualized network functions can be applied to multiple logical and/or physical locations within a virtualized infrastructure in a host service provider 130 that can utilize various software defined network technologies, including Infrastructure as a Service (IaaS), Platform as a Service (PaaS), and Software as a Service (SaaS) service models, virtual private service chains, etc.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving by an apparatus, via a wide area network, a request for deployment of a selected one of available virtualized network services advertised by the apparatus via the wide area network, the request identifying a host service provider to deploy the one virtualized network service;
   identifying, by the apparatus, virtualized network functions required by the host service provider for implementation of the one virtualized network service, each virtualized network function having a corresponding and distinct virtualized container specifying attributes for defining execution of the corresponding virtualized network function within one or more physical machines of the host service provider, the one virtualized network service and each virtualized network function distinct from any cloud service executed under control of a cloud orchestrator in the host service provider; and
   sending to a network orchestrator of the host service provider, via the wide area network, by the apparatus, a service container specifying instructions for the network orchestrator deploying the one virtualized network service among the physical machines having respective virtualization domains with respective distinct administrative controls, the network orchestrator distinct from the cloud orchestrator and the service container including instructions for causing the network orchestrator to deploy the virtualized network functions among the physical machines and as interdependent for implementation of the one virtualized network service by the host service provider.

2. The method of claim 1, further comprising:
   the apparatus choosing selected deployment locations for execution of the one virtualized network service, from among identified available deployment locations within the host service provider;
   the service container specifying the selected deployment locations for the one virtualized network service.

3. The method of claim 2, further comprising:
   determining, from a set of generic service requirements, selected generic service requirements for deployment of the one virtualized network service;
   sending, to a prescribed application programming interface of the host service provider, the selected generic requirements for the one virtualized network service; and
   receiving, from the prescribed application programming interface, the available deployment locations, the virtualized network functions required by the host service provider for implementation of the one virtualized network service, and policies required by the host service provider for the one virtualized network service, enabling the apparatus to create the service container for deployment of the one virtualized network service at the selected deployment locations.

4. The method of claim 3, wherein the selected generic requirements are sent by the apparatus, via the wide area network, to a prescribed web-based portal providing the prescribed application programming interface.

5. The method of claim 1, further comprising:
outputting, to a service vendor offering an offered virtualized network service, prescribed certification requirements for advertisement and distribution of the offered virtualized network service among the available virtualized network services; and
accepting from the service vendor, for the advertisement among the available virtualized network services, a corresponding service container defining the offered virtualized network service, based on determining the offered virtualized network service and the service vendor comply with the certification requirements.

6. The method of claim 1, further comprising:
receiving, from a user via the wide area network, a request of the available virtualized network services advertised by the apparatus;
determining, from the request, the host service provider utilized by the user from among available service providers; and
sending, to the user, a listing of only the available virtualized network services that are authorized by the host service provider.

7. The method of claim 1, further comprising the apparatus advertising the available virtualized network services using a web-based portal service reachable via the wide area network.

8. The method of claim 1, further comprising:
determining, from a set of generic service requirements, selected generic service requirements for deployment of the one virtualized network service;
sending, to a prescribed application programming interface of the host service provider, the selected generic requirements for the one virtualized network service; and
receiving, from the prescribed application programming interface, available deployment locations, the virtualized network functions required by the host service provider for implementation of the one virtualized network service, and policies required by the host service provider for the one virtualized network service, enabling the apparatus to create the service container for deployment of the one virtualized network service at selected deployment locations among the available deployment locations.

9. An apparatus implemented as a physical machine, the apparatus comprising:
non-transitory machine readable media configured for storing executable machine readable code;
a device interface circuit configured for receiving a request via a wide area network; and
a processor circuit configured for executing the machine readable code, and when executing the machine readable code operable for:
determining the request is for deployment of a selected one of available virtualized network services advertised by the apparatus via the wide area network, the request identifying a host service provider to deploy the one virtualized network service,
identifying virtualized network functions required by the host service provider for implementation of the one virtualized network service, each virtualized network function having a corresponding and distinct virtualized container specifying attributes for defining execution of the corresponding virtualized network function within one or more physical machines of the host service provider, the one virtualized network service and each virtualized network function distinct from any cloud service executed under control of a cloud orchestrator in the host service provider, and
sending to a network orchestrator of the host service provider, via the device interface circuit and via the wide area network, a service container specifying instructions for the network orchestrator deploying the one virtualized network service among the physical machines having respective virtualization domains with respective distinct administrative controls, the network orchestrator distinct from the cloud orchestrator and the service container including instructions for causing the network orchestrator to deploy the virtualized network functions among the physical machines and as interdependent for implementation of the one virtualized network service by the host service provider.

10. The apparatus of claim 9, wherein the processor circuit is further configured for choosing selected deployment locations, for execution of the one virtualized network service, from among identified available deployment locations within the host service provider, the service container specifying the selected deployment locations for the one virtualized network service.

11. The apparatus of claim 10, wherein the processor circuit is further configured for:
determining, from a set of generic service requirements, selected generic service requirements for deployment of the one virtualized network service;
sending, to a prescribed application programming interface of the host service provider, the selected generic requirements for the one virtualized network service; and
receiving, from the prescribed application programming interface, the available deployment locations, the virtualized network functions required by the host service provider for implementation of the one virtualized network service, and policies required by the host service provider for the one virtualized network service, enabling the apparatus to create the service container for deployment of the one virtualized network service at the selected deployment locations.

12. The apparatus of claim 11, wherein the selected generic requirements are sent by the apparatus, via the wide area network, to a prescribed web-based portal providing the prescribed application programming interface.

13. The apparatus of claim 9, wherein the processor circuit is further configured for:
outputting, to a service vendor offering an offered virtualized network service, prescribed certification requirements for advertisement and distribution of the offered virtualized network service among the available virtualized network services; and
accepting from the service vendor, for the advertisement among the available virtualized network services, a corresponding service container defining the offered virtualized network service, based on determining the offered virtualized network service and the service vendor comply with the certification requirements.

14. The apparatus of claim 9, wherein the processor circuit is further configured for:
receiving, from a user via the wide area network, a request of the available virtualized network services advertised by the apparatus;
determining, from the request, the host service provider utilized by the user from among available service providers; and
sending, to the user, a listing of only the available virtualized network services that are authorized by the host service provider.

15. The apparatus of claim 9, wherein the processor circuit is further configured for advertising the available virtualized network services using a web-based portal service reachable via the wide area network.

16. The apparatus of claim 9, wherein the processor circuit is further configured for:
determining, from a set of generic service requirements, selected generic service requirements for deployment of the one virtualized network service;
sending, to a prescribed application programming interface of the host service provider, the selected generic requirements for the one virtualized network service; and
receiving, from the prescribed application programming interface, available deployment locations, the virtualized network functions required by the host service provider for implementation of the one virtualized network service, and policies required by the host service provider for the one virtualized network service, enabling the apparatus to create the service container for deployment of the one virtualized network service at selected deployment locations among the available deployment locations.

17. One or more non-transitory tangible media encoded with logic for execution by a physical machine and when executed by the physical machine operable for:
receiving by the physical machine, via a wide area network, a request for deployment of a selected one of available virtualized network services advertised by the apparatus via the wide area network, the request identifying a host service provider to deploy the one virtualized network service;
identifying, by the physical machine, virtualized network functions required by the host service provider for implementation of the one virtualized network service, each virtualized network function having a corresponding and distinct virtualized container specifying attributes for defining execution of the corresponding virtualized network function within one or more physical machines of the host service provider, the one virtualized network service and each virtualized network function distinct from any cloud service executed under control of a cloud orchestrator in the host service provider; and
sending to a network orchestrator of the host service provider, via the wide area network by the physical machine, a service container specifying instructions for the network orchestrator deploying the one virtualized network service among the physical machines having respective virtualization domains with respective distinct administrative controls, the network orchestrator distinct from the cloud orchestrator and the service container including instructions for causing the network orchestrator to deploy the virtualized network functions among the physical machines and as interdependent for implementation of the one virtualized network service by the host service provider.

18. The one or more non-transitory tangible media of claim 17, when executed by the physical machine further operable for choosing selected deployment locations, for execution of the one virtualized network service, from among identified available deployment locations within the host service, the service container specifying the selected deployment locations for the one virtualized network service.

19. The one or more non-transitory tangible media of claim 17, when executed by the physical machine further operable for:
outputting, to a service vendor offering an offered virtualized network service, prescribed certification requirements for advertisement and distribution of the offered virtualized network service among the available virtualized network services; and
accepting from the service vendor, for the advertisement among the available virtualized network services, a corresponding service container defining the offered virtualized network service, based on determining the offered virtualized network service and the service vendor comply with the certification requirements.

20. The one or more non-transitory tangible media of claim 17, when executed by the physical machine further operable for:
determining, from a set of generic service requirements, selected generic service requirements for deployment of the one virtualized network service;
sending, to a prescribed application programming interface of the host service provider, the selected generic requirements for the one virtualized network service; and
receiving, from the prescribed application programming interface, available deployment locations, the virtualized network functions required by the host service provider for implementation of the one virtualized network service, and policies required by the host service provider for the one virtualized network service, enabling creation of the service container for deployment of the one virtualized network service at selected deployment locations among the available deployment locations.

* * * * *